United States Patent
Struthers

(12) 
(10) Patent No.: US 6,215,418 B1
(45) Date of Patent: Apr. 10, 2001

(54) PROGRAMMABLE MEMBRANE SWITCH INPUT/OUTPUT SYSTEM

(76) Inventor: Richard John Struthers, Nobleton (CA)

( * ) Notice: Subject to any disclaimer, the term of this patent is extended or adjusted under 35 U.S.C. 154(b) by 0 days.

(21) Appl. No.: 09/090,463

(22) Filed: Jun. 4, 1998

(30) Foreign Application Priority Data

Jun. 6, 1997 (CA) .................................................. 22072311

(51) Int. Cl.$^7$ .................................................. H03K 17/94
(52) U.S. Cl. .............................. 341/22; 341/26; 345/168; 400/477
(58) Field of Search .................................. 341/20, 22, 26; 345/168; 400/477; 340/815.4, 815.74, 815.44

(56) References Cited

U.S. PATENT DOCUMENTS

| | | |
|---|---|---|
| 3,691,554 | 9/1972 | Marschall . |
| 3,828,325 | 8/1974 | Stafford et al. . |
| 4,482,955 | 11/1984 | Amano et al. . |
| 4,706,068 | 11/1987 | Eberhard . |
| 4,853,888 | 8/1989 | Lata et al. . |
| 4,892,981 * | 1/1990 | Soloway et al. ...................... 200/5 A |
| 5,144,567 | 9/1992 | Oelsch et al. . |
| 5,379,382 | 1/1995 | Work et al. . |
| 5,424,731 | 6/1995 | Kronberg . |
| 5,450,078 * | 9/1995 | Silva et al. .............................. 341/26 |
| 5,487,673 | 1/1996 | Hurtarte . |
| 5,606,348 | 2/1997 | Chiu . |
| 5,610,601 | 3/1997 | Lahti et al. . |
| 5,615,344 | 3/1997 | Corder . |
| 5,623,261 * | 4/1997 | Rose ...................................... 341/20 |

* cited by examiner

Primary Examiner—Michael Horabik
Assistant Examiner—Timothy Edwards, Jr.
(74) Attorney, Agent, or Firm—Riches, McKenzie & Herbert LLP; Jeffrey Pervanas

(57) ABSTRACT

A programmable membrane switch input/output system is described. The system includes a membrane switch having a matrix layout embedded in a plastic film with a plurality of switches located at specific locations on the film. Output lines from the matrix layout are electrically connectable to a conversion unit which converts the output signals from a first code dependent on the matrix layout and the position of the switches to a second code which is independent of the position of the switches and the matrix layout. The conversion unit can convert the output signals into a serial code which can be transmitted serially from the conversion unit to a processing device located remotely from the membrane switch. By transferring the output signal serially from the conversion unit to the processing device, the cable can have fewer lines and less space is taken on the processing device for the connection. The conversion unit comprises a microprocessor and a memory unit which stores a conversion table to convert the output signals from the first code to the second code. The conversion unit can also filter the signal and end key rollover by transmitting only one output signal to the processing device in a predetermined time period. The conversion unit drives LEDs and seven segment displays on the membrane switch in response to signals received from the processing device to output information. A method of inputting information from a membrane switch to a processing device by utilizing the conversion unit is also described.

21 Claims, 3 Drawing Sheets

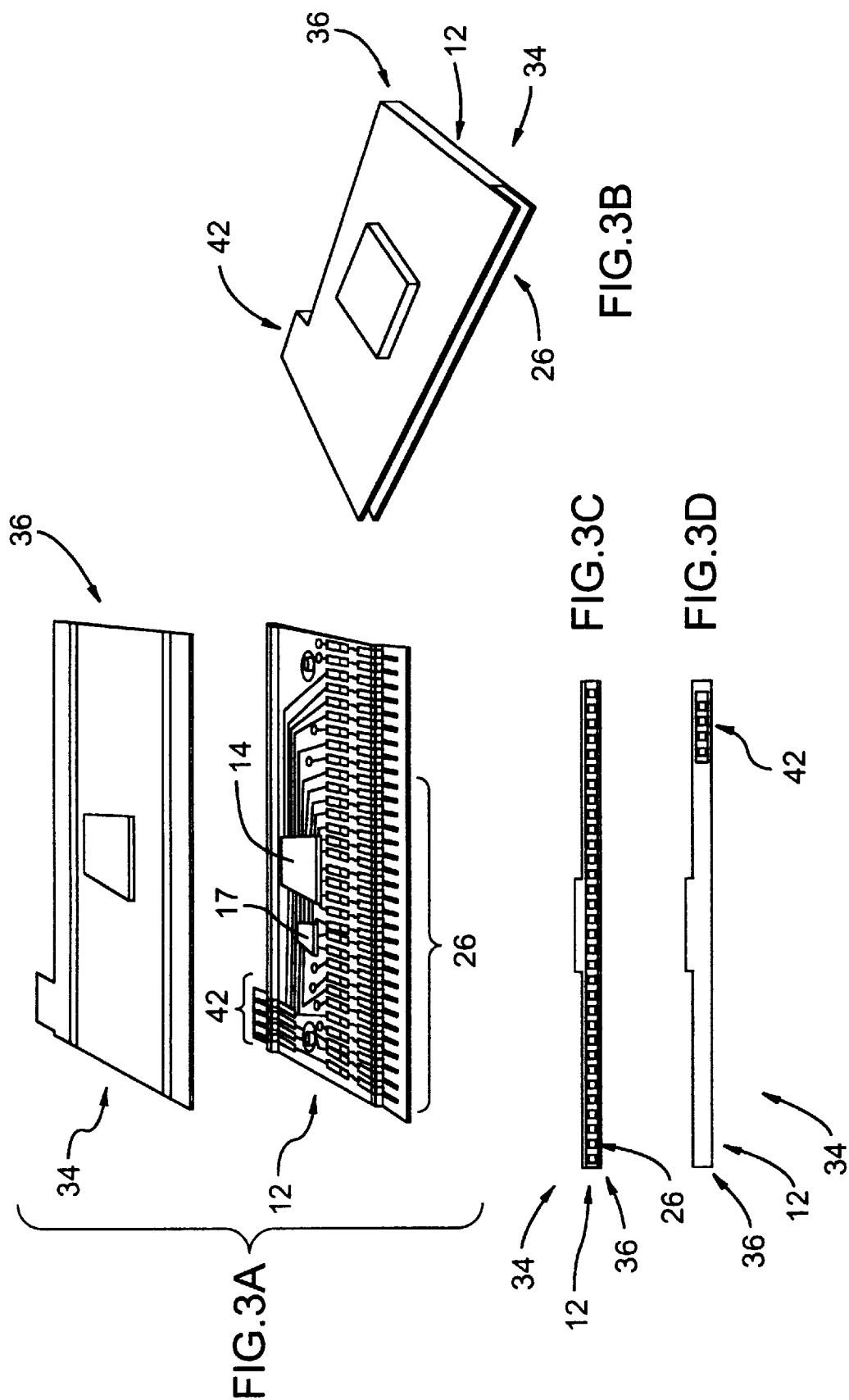

PROGRAMMABLE MEMBRANE SWITCH INPUT/OUTPUT SYSTEM

FIELD OF THE INVENTION

This invention relates to a membrane switch input/output system utilizing a membrane switch comprising a plurality of switches for inputting information. More particularly, the present invention relates to a programmable membrane switch input/output system having a membrane switch which transmits signals to and receives signals from a processing device located remotely from the membrane switch.

BACKGROUND OF THE INVENTION

Membrane switches comprising a plurality of switches have been used in the past to input information. In general, membrane switches comprise a circuit or matrix layout embedded in a plastic film. Switches, generally comprising domes, are located at specific locations in the plastic film. The matrix layout comprises a plurality of lines arranged in columns and rows upon the membrane. The switches are located at the intersection of a column and row line in the matrix layout such that when the switches are activated, the two lines in the matrix layout become electrically connected, decreasing the resistance between the two lines and thereby indicating that the corresponding switch has been activated. Domed switches can be activated by pressing down on the switch to electrically connect a row line with a column line.

In general, the columns and rows of the matrix layout must exit the membrane from the same location so that the output signals generated by activation of the switches can be easily taken from the membrane switch to a processing device. The processing device is usually located remotely from the membrane switch.

The column and row lines of the matrix layout end in output lines extending from the membrane switch. Pins can be attached to the output lines so that a cable having a connector at one end can be attached to the pins. The other end of the cable can then be attached to the processing device.

The processing device is generally the motherboard or logic board of an electrical element within which the membrane switch and motherboard are contained. The electrical element can be, for example, an electrical appliance, such as a microwave oven, with a membrane switch input/output system to allow the user to input information which is then sent to the motherboard of the microwave oven to operate the oven. The motherboard or logic board will generally contain a microprocessor to receive the signals from the membrane switch and send out control signals to operate the electrical appliance.

One disadvantage of the prior art systems is that the matrix layout generally has several columns and rows and therefore has a large number of output lines exiting from the membrane switch. Therefore, any cable which connects the membrane switch to the motherboard must have a separate line or wire for each output line of the membrane switch to transfer the output signal from the membrane switch to the motherboard. Clearly, this increases the cost of the system by requiring a more expensive cable. Also, this requires more space on the motherboard to connect the cable to the motherboard. Furthermore, several pins on the input/output chips of the motherboard must be dedicated to receiving the output signals from the membrane switch. Both of these features increase the cost and complexity of the motherboard.

A further disadvantage of the prior art systems is that the cable, connectors and output lines generally increase the resistance of the membrane switch. This increased resistance corrupts the signal by increasing noise and decreasing the signal during transmission from the membrane switch to the motherboard.

In addition, the switches on membrane switches suffer from "key rollover" because the switch does not cleanly connect the row and column lines, thereby often creating multiple erroneous signals upon each activation of a switch. However, the membrane switch has no means for cleaning the signal or debouncing the signal to end key rollover. While these problems could be corrected at the motherboard, this again increases the cost of the motherboard. Furthermore, if the manufacturer of the membrane switch is not the same as the manufacturer of the motherboard, the manufacturer of the motherboard may not know what type of filtering or signal processing are required for the membrane switch.

Some prior art membrane switches comprise LEDs which can be lit in response to activation of switches. However, to operate such LEDs, a transistor must be incorporated in the membrane switch to drive each LED, which increases the cost of the membrane switch. The prior art membrane switches do not have a means for activating and powering an LED located on the membrane switch from a location off of the membrane switch, but not on the motherboard.

In addition, many processing devices, such as motherboards, are designed to accept a predetermined code, meaning that a predetermined combination of signals on the lines being inputted to the motherboard identify activation of a specific switch on the membrane switch. Generally, the manufacturer of the motherboard would not also be the manufacturer of the membrane switch. Therefore, the manufacturer of the membrane switch must arrange the matrix layout to conform with the predetermined code required by the processing device. This often increases the complexity of the matrix layout in the membrane switch by requiring lines in the matrix to cross over one another. Each time a line in a membrane switch crosses over another line, a bridge must be inserted in the membrane layout to avoid short-circuiting the two lines, which increases the cost of manufacture of the membrane switch. This problem is compounded when the matrix layout must avoid a display area in the membrane switch through which the lines forming a matrix layout cannot pass. In either case, the membrane switches must be customized so that the matrix layout provides output signals in the code required by the processing device. This customization increases costs by requiring several different types of membrane switches to be designed and manufactured. Furthermore, an existing membrane switch cannot be altered or re-wired. Therefore, an existing membrane switch cannot be changed or re-wired to meet new requirements, but rather must be replaced if its code is incorrect or the predetermined code which the processing device will accept has changed.

SUMMARY OF THE INVENTION

Accordingly, it is an object of this invention to at least partially overcome the disadvantages of the prior art. Also, it is an object of this invention to provide an improved type of membrane switch input system which can provide a clean signal from the membrane switch to a motherboard in a code which can be used by the motherboard but without increasing the complexity of the matrix layout. It is also an object of the present invention to provide a membrane switch input system which utilizes a cable to connect the membrane switch to the processing device with a number of lines which is less than the number of output lines of the membrane switch.

Accordingly, in one of its objects, the present invention resides in a membrane switch input/output system for inputting information to a processing device comprising: a membrane switch having a matrix layout and comprising a plurality of switches located on the membrane switch such that activation of said switches causes output signals to be generated in a first code, said output signals indicating which switch was activated; conversion means electrically connectable to said membrane switch and said processing device for receiving the output signals from the membrane switch in the first code and converting output signals from the first code to a second code for transmission to the processing device; wherein the first code is dependent on the matrix layout of the membrane switch and the location of the switches on the matrix layout; and wherein the second code can be used by the processing device and is independent of the matrix layout of the membrane switch and the location of the switches on the matrix layout.

In a further aspect, the present invention resides in a method of inputting information from a membrane switch, having a matrix layout and a plurality of switches to a processing device, said method comprising the steps of: (a) generating an output signal in a first code in response to activation of one of the switches; (b) converting the output signal from the first code, which is dependent on the matrix layout of the membrane switch and the location of the switches on the matrix layout, to a second code, which is independent of the matrix layout of the membrane switch and the location of the switches on the matrix layout; and (c) transmitting the output signal to the processing device in the second code.

Accordingly, the present invention provides a membrane switch input system utilizing a conversion means which is located near the membrane switch. In this way, the conversion means can convert the output signal from a first code, corresponding to that generated by the membrane switch, to a second code which conforms with the predetermined code of the processing device and can be used by the processing device. In addition, if the second code used by the processing device does not require several lines, the number of lines on the cable and the space required on the motherboard can be decreased, resulting in a corresponding cost savings. Furthermore, the conversion means is located near the membrane switch so that there is little loss of signal due to resistance over the cable.

In a preferred embodiment, the conversion means can be programmed with a conversion table to convert output signals in the first code to the second code. In this way, the conversion table in the conversion means can be erased and replaced with a conversion table to convert the output signals from the first code to a third code different from the first code or the second code.

A further advantage of the present invention is that the conversion means can include an LED driver or a seven segment display driver to power LEDs and displays on the membrane switch. In this way, additional components, such as transistors, need not be wired into the membrane switch, thereby decreasing the cost.

Also, the conversion means can include a signal filter. In particular, the conversion means could include circuitry to stop debouncing and end key rollover. This circuitry can be a timing circuit which limits the number of outputs which could be sent on each output line during a predetermined time period. This debounces the signal and ends key rollover by eliminating multiple signals being generated upon each activation of a switch in a predetermined time period. The predetermined time period could be a fraction of a second to up to ten seconds depending on the application.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention:

FIG. 3A shows an exploded view of a connector incorporating a conversion unit according to one embodiment of the present invention;

FIG. 3B shows a perspective view of the connector shown in FIG. 3A;

FIG. 3C shows a front view of the connector shown in FIG. 3A; and

FIG. 3D shows a rear view of the connectors shown in FIG. 3A.

DETAILED DESCRIPTION OF THE PREFERRED EMBODIMENTS

Figure 1:
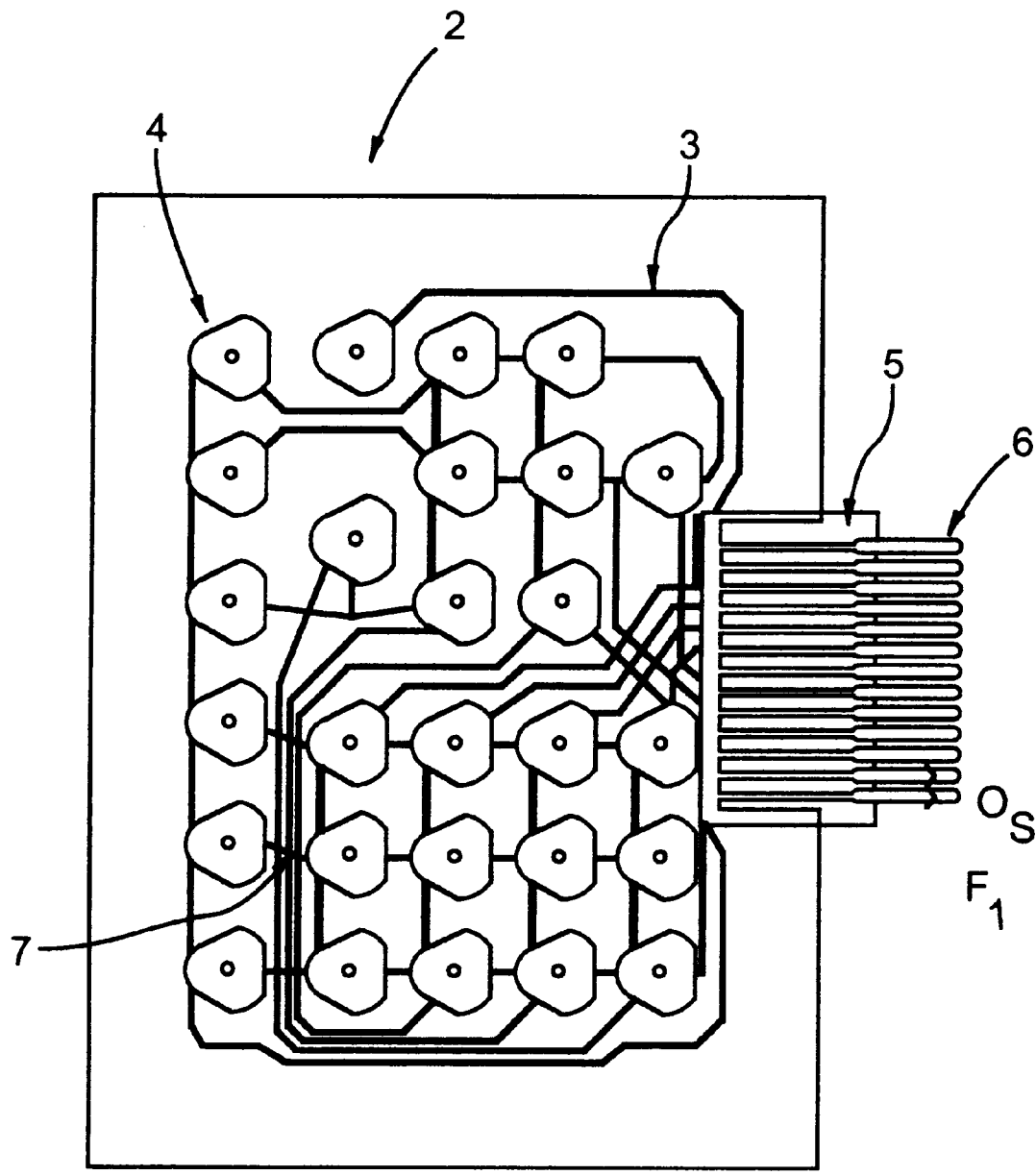
FIG. 1 shows a top view of a membrane switch.

FIG. 1 shows a membrane switch, marked generally by reference numeral 2, which can be used in one embodiment of the present invention. The membrane switch has a matrix layout 3 shown generally by the lines leading from the switches 4 to the output lines 5. The output lines 5 are connected to pins 6 and can send output signals $O_s$ when electrically connected to a connector.

The plurality of switches 4 are located on the membrane switch 2 in a predetermined pattern depending on the purpose for which the membrane switch 2 has been created. The switches 4 shown in FIG. 1 are dome switches 4 which can be activated by pressing down on the corresponding switch 4. Activation of any one of the switches 4 causes an output signal $O_s$ to be generated by bringing into contact the corresponding row line and column line in the matrix layout 3, decreasing the resistance between these two lines. The output signal $O_s$ indicating activation of a switch 4 will thus be generated in a first code $C_1$ by the resistance of the corresponding two output lines 5 decreasing over the other output lines 5.

It is apparent that which of the output lines 5 show a decrease in resistance will depend on the matrix layout 3 and the location of the switch 4 which has been activated on the membrane switch 2. Thus, the first code $C_1$ is dependent on the matrix layout 3 of the membrane switch 2 and the location of the switches 4 on the matrix layout 3. The first code $C_1$ can of course be varied by changing the matrix layout 3 so that the output lines 5 corresponding to specific switches 4 exit the membrane switch at predetermined locations. This can be done, for example, by arranging the matrix layout 3 so that the lines corresponding to specific switches 4 lead to specific output lines 5. However, to accomplish this the number of cross-overs where two lines on the matrix layout 3 cross-over, one of which is shown generally by reference numeral 7 in FIG. 1, increases greatly. At each cross-over 7, a bridge must be formed in the membrane switch 2 to avoid short circuiting the lines being crossed over. Each time a bridge is required at a cross-over 7, the cost to manufacture the membrane switch 2 increases. Also, the complexity of the matrix layout 3 increases to provide output signals $O_s$ at the output lines 5 having a specific code.

Figure 2:
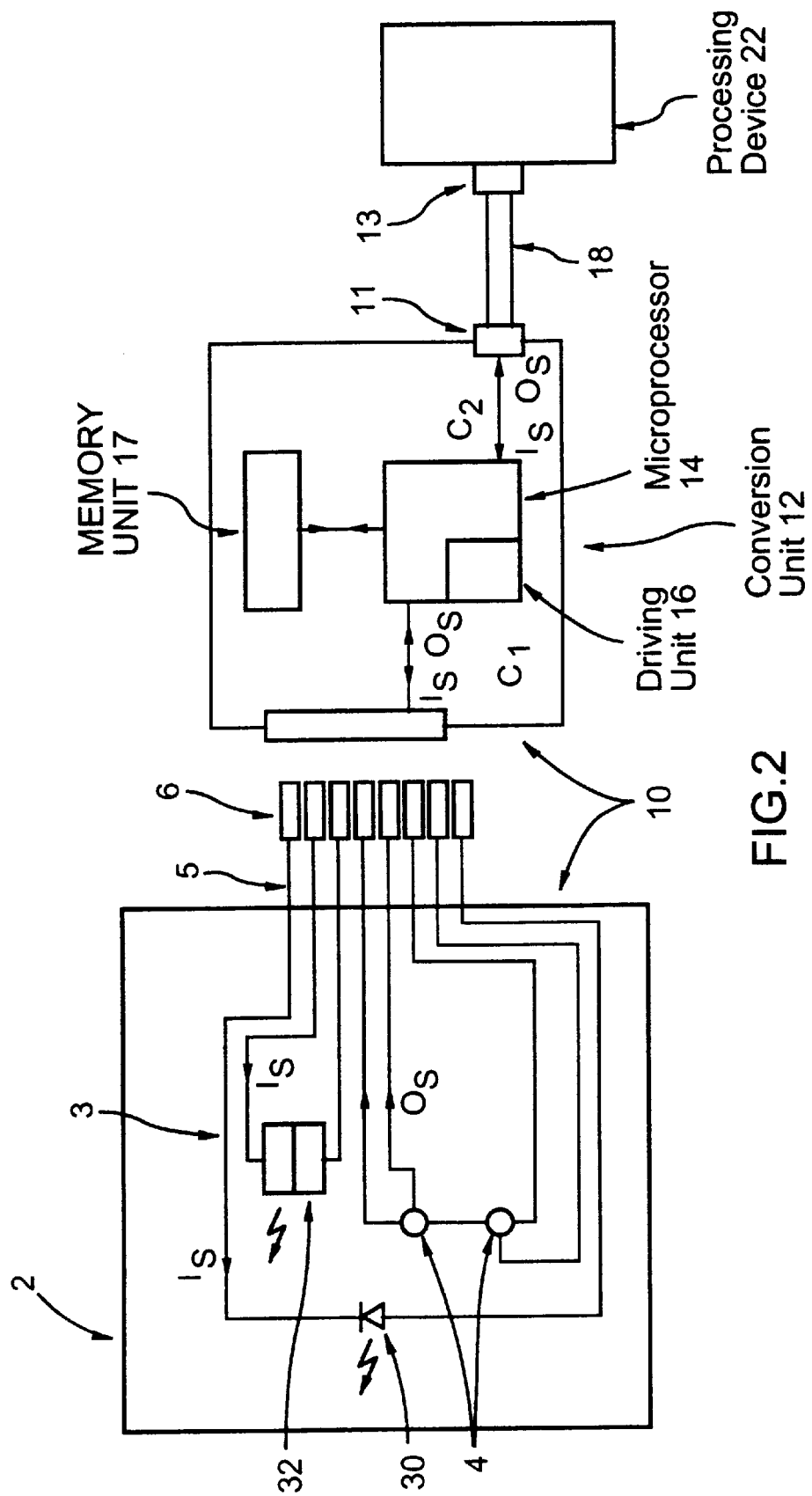
FIG. 2 shows a schematic drawing of a membrane switch input system according to one embodiment of the invention.

FIG. 2 shows a programmable membrane switch input/output system, shown generally by reference numeral 10, according to one embodiment of the invention. As shown in FIG. 2, the system 10 comprises the membrane switch 2 and a conversion unit 12. The matrix layout 3 of the membrane switch 2 shown in FIG. 2 has been simplified for purposes of illustration. The system 10 comprises a conversion unit 12 which is electrically connectable to the membrane circuit 2. The conversion unit 12 is also electrically connectable to a processing device, shown generally by reference numeral 22 in FIG. 2.

The conversion unit 12 receives the output signals $O_s$ from the membrane switch 2 in the first code $C_1$. The conversion unit 12 converts the output signals $O_s$ from the first code $C_1$ to a second code $C_2$ which can be used and understood by the processing device 22. The conversion unit 12 then transmits the output signal $O_s$ in the second code $C_2$ to the processing device 22. The second code $C_2$ can be any type of code and is independent of the matrix layout 3 of the membrane switch 2 and the location of the switches 4 on the matrix layout 3 which generated the output signals $O_s$.

By using the conversion unit 12, the matrix layout 3 of the membrane switch 2 representing the first code $C_1$ can be simplified. For example, the number of circuit cross-overs 7 can be minimized because the output signals $O_s$ are sent to the processing device 22 in the second code $C_2$ which is independent of the matrix layout 3 and the location of the switches 4. In a preferred embodiment, the second code $C_2$ requires fewer lines to transmit the output signals $O_s$ to the processing device 22 than the number of output lines 5 required by the membrane switch 2 to transfer the output signals $O_s$ to the conversion unit 12. More preferably, the second code $C_2$ transmits the output signals $O_s$ in a serial format, thereby requiring only four lines, namely two input/output lines, a ground line and a power line. This decreases the cost of the cable 18 connecting the conversion unit 12 to the processing device 22 and also decreases the space or "real estate" on the processing device 22 which must be dedicated to the transfer of information into and out of the membrane switch 2. The second code $C_2$ can be TTL, SPI, $I^2C$ or RS232 compatible.

The conversion unit 12 preferably comprises a microprocessor 14 and a memory unit 17. The memory unit 17 stores a conversion table which can convert output signals $O_s$ from the first code $C_1$ to the second code $C_2$. In FIG. 2, the microprocessor 14 is shown separate from the memory unit 17, but the conversion table could also be stored in flash memory located in the microprocessor 14. In a preferred embodiment, the microprocessor 14 is a C-MOS central processor manufactured by Atmel having product number SSOP44 and called pin microprocessor.

Preferably, the memory unit 17 is electrically erasable. In this way, a conversion table to convert output signals $O_s$ from the first code $C_1$ to the second code $C_2$ can be initially stored in the memory unit 17. However, if a different membrane switch 2 or a different processing device 22 is used, the memory unit 17 can be re-set or re-programmed with a conversion table to convert the output signals $O_s$ from the first code $C_1$ to another code, such as a third code $C_3$ (not shown). If a different membrane switch 2 is used which outputs signals $O_s$ in a fourth code $C_4$ (not shown) different from the first code $C_1$, the memory unit 17 can be re-programmed to convert the output signals $O_s$ from this fourth code $C_4$ to the second code $C_2$ or another code.

The membrane switch 2 may also contain at least one light emitting diode 30 or a seven segment display 32. The light emitting diode 30 and the seven segment display 32 are output devices which output information to the user of the system 10. The seven segment display 32 can be formed by seven light emitting diodes or by a liquid crystal display. In either case, the light emitting diode 30 and the seven segment display 32 are lit in response to input signals $I_s$ from the processing device 22.

The input signals $I_s$ are received by the microprocessor 14 of the conversion unit 12 through the cable 18 from the processing device 22. Initially, the input signals $I_s$ are in the second code $C_2$. The conversion unit 12 converts the input signals Is into the first code $C_1$. This conversion process is similar to the conversion process for the output signals $O_s$, and generally utilizes a conversion table stored in the memory unit 17. The input signals $I_s$ are then sent out through the output/input lines 5 of the membrane switch 2. The input signals $I_s$ can travel on separate lines of the matrix layout 3 as shown in FIG. 2. Alternatively, the input signals $I_s$ can travel along the matrix layout 3 on lines which are also connected to the switches 4. In cases where the output lines 5 are used solely to receive input signals $I_s$, these lines can be referred to as input lines 5. The lines on the membrane switch 2 which receive the input signals $I_s$ and send the output signals $O_s$ will be collectively referred to as output/input lines 5.

Generally, a transistor must be present on the membrane switch 2 in order to power a light emitting diode 30 or a seven segment display 32. However, in a preferred embodiment, the conversion unit 12 comprises a driving unit 16 which can form part of the microprocessor 14. The driving unit 16 sends the input signal $I_s$ at a current and voltage level which allows the light emitting diode 30 to emit light and the seven segment display 32 to operate. By having the driving unit 16 form part of the conversion unit 12, the complexity and the cost of manufacturing membrane switch 2 decreases.

The conversion unit 12 can also comprise filtering means to filter the output signals $O_s$ from the membrane switch 2 prior to transmission to the processing device 22. In a preferred embodiment, the microprocessor 14 is programmed to limit the number of output signals $O_s$ which can be sent to the processing device 22 in a predetermined time period. In this way, the conversion unit 12 prevents key rollover which results when a single activation of a switch 4 causes multiple signals $O_s$ to be generated. This is often caused by the dome switches 4 because contact of the column and row lines in the matrix layout 3 is not cleanly made. By limiting the number of output signals $O_s$ which can be sent from the conversion unit 12 to the processing device 22 during a predetermined time period, such as 0.1 seconds to 1 second, erroneous output signals $O_s$ caused by key rollover are eliminated.

Generally, the membrane switch 2 is located remotely from the processing device 22. In this case, a cable 18 is used to transmit the output signals $O_s$ to the processing device 22. However, to decrease the signal loss through the cable 18, it is preferable to have the conversion unit 12 proximate the membrane switch 2. In this way, the conversion unit 12 receives the output signals $O_s$ before the output signals $O_s$ are sent on the cable 18, avoiding degradation of the output signals $O_s$ by the cable 18, and improving the overall reliability of the system 10. In addition, because the conversion unit 12 is proximate the light emitting diode 30 and the seven segment display 32, any input signals $I_s$ sent to the light emitting diode 30 or the seven segment display 32 will not loose power due to increased resistance from travelling over a cable.

FIG. 2 shows the output/input lines 5 having pins 6 for connection to the conversion unit 12. However, it is understood that the conversion unit 12, comprising the microprocessor 14 and the memory unit 17, could be located on the membrane switch 2. In this case, the output/input lines 5 would not terminate at pins 6, but rather would be connected directly to the microprocessor 14, eliminating the need for pins 6 entirely.

In the case where the conversion unit 12 is not located on the membrane circuit 2, it is preferable that the conversion unit 12 be located in the connector housing 36 of the cable connector 18 to the membrane switch 2. This embodiment is shown in FIGS. 3A, 3B, 3C and 3D.

FIG. 3A shows an exploded perspective view of a connector 34 for connecting a first end 11 of the cable 18 to the pins 6 connected to the output lines/input 5 of the membrane switch 2. The second end 13 of the cable 18 can be connected to the processing device 22. In the preferred embodiment shown in FIG. 3A, the conversion unit 12 is located within the connector housing 36 of the connector 34. The microprocessor 14 and the memory unit 17 are located on a circuit contained within the connector housing 36. At the front end, the connector housing 36 comprises programmable matrix input/output lines 26 which mate with the pins 6 connected to the output/input lines 5 of the membrane switch 2. The rear end of the connector housing preferably has a serial input/output port 42 for connection to the first end 11 of the cable 18. The serial input/output port 42 also has a power and ground connection for supplying power to the microprocessor 14, the memory unit 17 and any light emitting diodes 30 or seven segment displays 32 located on the membrane switch 2.

Preferably, the matrix input/output lines 26 are programmable by the microprocessor 14. In this way, the programmable matrix input/output lines 26 coming from the connector 34 can be programmed to correspond to the output/input lines 5 from the membrane switch 2. This increases the versatility of the connector 34 by accommodating itself to any type of matrix layout 3. It also allows the designer of the membrane switch 2 to minimize the complexity of the matrix layout 3 by not being constricted with the arrangement of the location of the output/input lines 5, or of the first code $C_1$ of the output signal $O_s$.

FIG. 3B shows a perspective view of the connector 34. FIGS. 3C and 3D show a front view and a rear view of the connector 34, respectively.

The present invention also relates to a method of inputting information from the membrane switch 2 comprising the steps of generating an output signals $O_s$ in a first code $C_1$ in response to activation of one of the switches 4. The output signal $O_s$ indicates which switch 4 has been activated. The output signal $O_s$ is then converted from the first code $C_1$, which is dependent on the matrix layout 3 of the membrane switch 2 and the location of the switches 4 on the matrix layout 3, to a second code $C_2$, which is independent of the matrix layout 3 of the membrane switch 2 and the location of the switches 4 on the matrix layout 3. The output signal $O_s$ is then transmitted to the processing device 22 in the second code $C_2$. The first code $C_1$ is selected to simplify the matrix layout 3 of the membrane switch 2 and decrease the number of cross-overs 7. The second code $C_2$ is preferably a serial code to transfer the output signals $O_s$ serially along the cable 18 to the processing device 22.

The above steps can be repeated upon each activation of one of the switches 4 to successively input information from the membrane switch 2 to the processing device 22. In a preferred embodiment, the step of converting the output signals $O_s$ from the first code $C_1$ to the second code $C_2$ can only be performed once in the predetermined time period to prevent key rollover.

When the processing device 22 requires the output signals $O_s$ in another code, other than the second code $C_2$, or if the membrane switch 2 is changed, the conversion unit 12 can be reset to convert the output signals $O_s$ from the first code $C_1$ to a new code. The conversion unit 12 then transmits the output signals $O_s$ to the processing device 22 in the new code.

It is understood that the processing device 22 can be any type of device which requires or can process the information inputted through the membrane switch 2. In a preferred embodiment, the processing device 22 is a logic board or a motherboard of an appliance or other electronic device. The information inputted through the membrane switch 2 can comprise instructions for operation of the appliance. These instructions are converted by the conversion unit 12 and sent to the motherboard for execution by the motherboard. The motherboard can then send input signals $I_s$ through the conversion unit 12 to the light emitting diode 30 or seven segment display 32 to indicate that the instructions have been received.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

The embodiments of the invention in which an exclusive property or privilege is claimed are defined as follows:

1. A membrane switch input/output system for inputting information to a processing device comprising:

a membrane switch having a matrix layout and comprising a plurality of switches located on the membrane switch such that activation of said switches causes output signals to be generated in a first code, said output signals indicating which switch was activated;

conversion means electrically connectable to said membrane switch and said processing device for receiving the output signals from the membrane switch in the first code and converting output signals from the first code to a second code for transmission to the processing device;

light emitting diodes on the membrane switch;

wherein the first code is dependent on the matrix layout of the membrane switch and the location of the switches on the matrix layout;

wherein the second code can be used by the processing device and is independent of the matrix layout of the membrane switch and the location of the switches on the matrix layout; and wherein the conversion means comprises light emitting driving means electrically connectable to the light emitting diodes for selectively driving the light emitting diodes in response to input signals from the processing device.

2. The system as claimed in claim 1 wherein the first code is selected so that the circuit layout of the membrane switch has a minimum number of circuit cross-overs.

3. The system as claimed in claim 1 wherein the membrane switch is located remotely from the processing device and the conversion means is located proximate the membrane switch.

4. The system as claimed in claim 1 further comprising:
light emitting diodes on the membrane switch; and
wherein the conversion means comprises light emitting driving means electrically connectable to the light emitting diodes for selectively driving the light emitting diodes in response to input signals from the processing device.

5. The system as claimed in claim 1 further comprising:
at least one seven segment display located on the membrane switch for outputting information;
wherein the conversion means comprises drive means for driving the seven segment displays in response to input signals from the processing device; and
wherein the drive means is electrically connected to the seven segment displays.

6. The system as claimed in claim 1 wherein the membrane switch comprises output lines for outputting the output signals to the conversion means.

7. The system as claimed in claim 6 wherein the second code requires fewer lines to transmit the output signals to the processing means than the first code.

8. The system as claimed in claim 6 further comprising connector means for releasably connecting a first end of a cable to the output lines of said membrane switch and releasably connecting a second end of the cable to the processing device for transmitting the output signals to the processing device.

9. The system as claimed in claim 8 wherein the connector means comprises a connector housing located at the first end of the cable for mating with pins electrically connected to the output lines; and
wherein the conversion means is located in the connector housing.

10. The system as claimed in claim 9 wherein the second code requires fewer lines to transmit the output signals to the processing means than the first code.

11. The system as claimed in claim 10 wherein the output signals are transmitted serially to the processing device and the cable requires four lines to transmit the output signal to the processing device and send power to operate the conversion means.

12. The system as claimed in claim 11 wherein the processing device is a motherboard of an appliance.

13. The system as claimed in claim 9 wherein the conversion means comprises memory means for storing a conversion table to convert the output signals in the first code to the second code.

14. The system as claimed in claim 13 wherein the memory means are erasable such that the conversion table to convert the output signals from the first code to the second code can be replaced with a conversion table to convert the output signals from the first code to a third code.

15. The system as claimed in claim 14 wherein the conversion means comprises rollover prevention means for limiting the output signals which can be transmitted to the processing device in a predetermined time period.

16. A method of inputting information from a membrane switch, having a matrix layout and a plurality of switches to a processing device, said method comprising the steps of:
(a) generating an output signal in a first code in response to activation of one of the switches;
(b) coverting the output signal from the first code, which is dependent on the matrix layout of the membrane switch and the location of the switches on the matrix layout, to a second code, which is independent of the matrix layout of the membrane switch and the location of the switches on the matrix layout;
(c) transmitting the output signal to the processing device in the second code;
(d) repeating steps (a), (b) and (c) upon each activator of one of the switches; and wherein step (b) of converting the output signal can only be performed once in a predetermined time period.

17. The method as claimed in claim 16 wherein the first code is related to the matrix layout and the first code is selected so as to decrease the cross-overs of the matrix layout.

18. The method as claimed in claim 17 further comprising the step of:
(d) repeating steps (a), (b) and (c) upon each activation of one of the switches;
wherein step (b) of converting the output signal can only be performed once in a predetermined time period.

19. The method as claimed in claim 17 wherein the output signals are converted by a conversion means located proximate the membrane switch, said conversion means being set to convert output signals from the first code to the second code.

20. The method as claimed in claim 19 further comprising the steps of:
(e) re-setting the conversion means to convert the output signals from the first code to a third code, different from the second code, when the processing device requires the output signals in the third code; and
(f) transmitting the output signal to the processing device in the third code.

21. The method as defined in claim 19 wherein the membrane switch comprises light emitting diodes and the conversion means comprises light emitting driving means; and
wherein the method further comprises the step of:
selectively driving the light emitting diodes by the conversion means in response to input signals from the processing device.

\* \* \* \* \*